(12) United States Patent
Shagam

(10) Patent No.: US 6,311,326 B1
(45) Date of Patent: Oct. 30, 2001

(54) ONLINE DEBUGGING AND TRACING SYSTEM AND METHOD

(75) Inventor: Eli Shagam, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/224,921

(22) Filed: Jan. 4, 1999

(51) Int. Cl.[7] .................................................. G06F 9/445
(52) U.S. Cl. ........................................................... 717/4
(58) Field of Search ......................... 717/1, 3, 5; 714/27, 714/47, 45, 207, 53

(56) References Cited

U.S. PATENT DOCUMENTS

| | | | |
|---|---|---|---|
| 5,127,103 | * 6/1992 | Hill et al. ................................ | 714/45 |
| 5,175,856 | * 12/1992 | Van Dyke et al. ...................... | 714/4 |
| 5,450,586 | * 9/1995 | Kuzara et al. .......................... | 714/4 |
| 5,748,881 | * 5/1998 | Lewis et al. ............................ | 714/47 |
| 5,832,205 | * 11/1998 | Kelly et al. ............................. | 714/53 |
| 5,930,470 | * 7/1999 | Noguchi et al. ....................... | 714/38 |
| 6,154,856 | * 11/2000 | Madduri et al. ....................... | 714/27 |
| 6,158,045 | * 12/2000 | You ......................................... | 717/4 |
| 6,161,216 | * 12/2000 | Shagam ................................... | 717/4 |
| 6,199,152 | * 3/2001 | Kelly et al. ............................ | 711/207 |

OTHER PUBLICATIONS www.google.com, "AdaTEST," Quality Checked Software, LTD. (1996), copyright of IPL Information Processing Ltd.*
www.google.com, Texas Instruments, TM370 Family EPROM/EEPROM Programming Tool (1996), Microprocessor Development Systems.*
Hunt Engineering, API and software tools for PC hosts Description and reference, (May 1998).*
Oracle 7 Enterprise Backup Utility Administrator's Guide, Chapter 8, Managing and Troubleshooting (1996).*
Andreas Danuser et al; "Was geschielt wann wo im Programm?" vol. 82, No. 35; Aug 31, 1990; pp. 48–57.

* cited by examiner

*Primary Examiner*—Mark R. Powell
*Assistant Examiner*—Michael B. Holmes
(74) *Attorney, Agent, or Firm*—Hale and Dorr LLP

(57) ABSTRACT

The invention relates to a method and apparatus for debugging software running in a target machine. A debugging set-up script is created in a host machine which defines trace point locations, and the variables to be returned to the host machine. The method sends the trace point locations and variables to the target machine where a stub program running in the target machine effects the modification of a software program in the target machine by inserting traps at the trace points. Data is collected using the stub program to ascertain variable values when a trace point is hit and the acquired variable data are stored in the target machine in a target machine buffer memory. The collected data is sent, at the request of the host machine, or at the end of a predetermined time, or when a pass-count is reached or at a time set by the target machine, to the host machine without stopping or interrupting operation of the target system.

27 Claims, 3 Drawing Sheets

ONLINE DEBUGGING AND TRACING SYSTEM AND METHOD

BACKGROUND OF THE INVENTION

The invention relates generally to source code debugging methods and apparatus, and in particular, to the debugging of software programs using trace points set using a debugging tool.

As computer programs become increasingly complex, the programs will, more likely than not, contain errors or "bugs" that prevent the proper performance and operation of the program in its intended manner. The program is then debugged, which is the process of locating and correcting the errors in the program. In complex programs, the debugging process be quite difficult and as a result one approach to debugging software uses the insertion of break points at locations within the code. The execution of the source code program then halts whenever a break point is encountered to allow the programmer to observe the state of certain variables and, accordingly, the behavior of the program at the break point.

In certain applications, stopping the program at a break point can be quite disruptive to the system. Thus, for example, in a large shared data storage subsystem such as the EMC Symmetrix series of products, halting the program in effect stops the entire data reading, writing, and caching process. In this instance, not only can the flow of data be disrupted for on the order of several minutes, or more, but the behavior of the system, and hence the analysis of an error, can be completely masked by the system stoppage because, for example, other external subsystems may then go into a recovery mode.

It has been known to store data relating to trace events in buffer memories within the Symmetrix device for later analysis. This approach has the advantage of not interrupting the system while at the same time collecting data, as necessary, for later review and analysis. Such a system typically does not enable the user to dynamically alter or change the system software and trace points, or to contemporaneously analyze the system software as a program continues.

As a result, in accordance with the present invention, a debugging system tool and method can be provided which enable immediate and certain interaction, on line, with the software program operating, for example, in a large shared data storage system. In addition, the method and apparatus of the current invention advantageously provide online access to debug the system while, at the same time, not significantly disrupting operation of the system so as to mask any error occurring in the operation of the source code.

SUMMARY OF THE INVENTION

The invention relates to a method and apparatus for online debugging software running on a target machine. The method features defining trace point locations (addresses) and data and variables to be collected at those trace points in the software at a host machine; sending the trace point locations and variables, for example in a debugging script, to the target machine, maintaining a stub program in the target machine to perform the debugging script, collecting the data and variables at the predefined trace points, using the stub program, the data representing variables identified by the host machine debugging script when a trace point is reached, and sending the collected data, online, at the request of the host machine, without significantly interrupting or stopping operation of the target machine. In a particular embodiment, the target machine is a disk drive controller.

In other aspects, the invention features determining, at the target machine, using an expression evaluation, locations for each variable for which data is to be collected when a trace point is reached and passed through, the variables being originally specified by the host machine debugging script in the form of numeric expressions from a compiler symbol table. In another aspect, the trace points may be automatically set at the host machine and the variables are automatically identified at the host machine.

In another aspect, in accordance with the invention, the collected data is directed to a buffer, in the target machine, for storage; and when the buffer overflows, the data is wrapped around the buffer thereby erasing the old data and replacing it with new data. In this way, only the last frames of data are kept in the buffer.

In another aspect, the apparatus of the invention provides for debugging software (the stub) running in a target machine and comprises a host machine, elements for defining, in the host machine, trace point locations and variables to be collected by the software, circuitry for sending the trace point locations and variables to the target machine, circuitry for running a stub program in the target machine, circuitry for collecting, using the stub program, data representing the variables selected by the user on the host machine. When a trace point is reached, the circuitry sends the collected data, online, to the host machine without stopping operation of the target machine.

In yet another aspect of the invention, the apparatus is a computer implemented apparatus for debugging, from a host computer, software running in a target machine. The invention provides for software media in both the target machine and the host computer to implement the steps of defining, in the host computer, trace point locations and variables to be collected by the software on the target machine, sending the trace point locations and variables to the target machine, running a stub program in the target machine, collecting, using stub program, data representing the variables selected by the user, for example, at the host computer when a trace point is reached and passed through, and providing the collected data, online, to the host computer without stopping operation of the target machine.

The method and apparatus of the invention thus advantageously enable debugging of the target computer or disk controller with minimal disturbance to the operation of the target machine.

BRIEF DESCRIPTION OF THE DRAWINGS

Other features and advantages of the invention will be apparent to one practiced in this field from the following description of the invention taken together with the drawings, in which.

DESCRIPTION OF THE PREFERRED EMBODIMENTS

Figure 1:
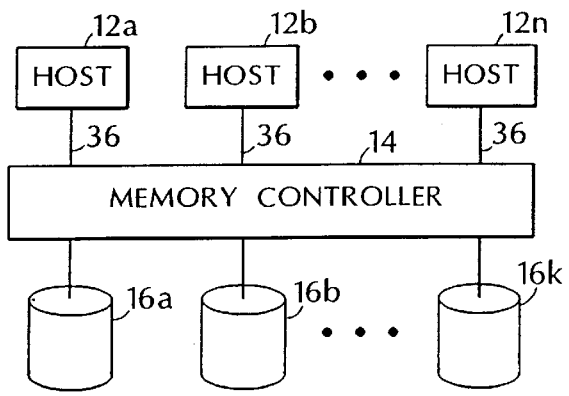
FIG. 1 is a general block diagram illustrating the system in which the invention has particular application.

Referring to FIG. 1, the invention relates to a computer system wherein at least one, and more likely a plurality of hosts 12a, 12b, . . . , 12n, connect to a memory module system 14, such as the EMC Symmetrix disk array memory system. The memory module 14 acts as the interface between the host computers and a plurality of mass storage devices, such as, for example, disk drives 16a, 16b, . . . , 16k. Data written by the host or read from the disk drive elements pass through the memory module system which acts as a two way communications path with substantial capabilities. For example, in some systems, the data from the host are uniformly striped across all or some of the disk storage devices; and in other systems, the data from the host are stored on the disk drives 16 according to a RAID protocol. In yet other embodiments of the invention, all of the data from a particular host can be stored on a single disk drive or in different logical volumes of the same or different disk drives, depending upon the nature and the source of the data and host. A host computer can also read data from one or more of the disk drive units.

When a problem arises which impairs performance of the system, for example, a non-recoverable software error, a decrease in throughput, or "bugs" in newly installed software, the problem can arise in either the host, the memory module, the disk drive elements, or in combinations thereof. In order to analyze and correct the problem, it is desirable not to bring down the customer's computer(s) or the controller, thereby placing them off-line and perhaps significantly impairing the customer's ability to do business. In accordance with the invention, therefore, when a software bug is suspected, for example, or to read system parameters at selected event times of the system operation, trace points are inserted in the software and data is collected without substantially imposing any significant performance degradation on the customer's system. As described below, data can then be remotely collected for analysis without having to bring down, stop, or otherwise interfere substantially with the system operation.

Figure 2:
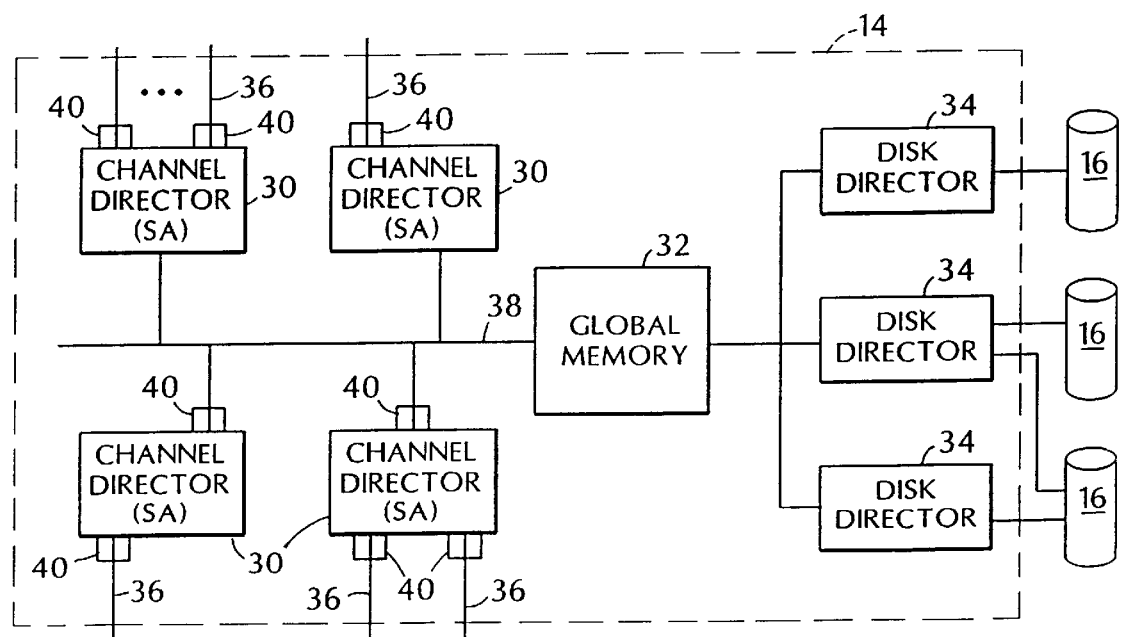
FIG. 2 is a block diagram illustrating in more detail a typical environment in accordance with the invention.

Referring to FIG. 2, in a particular embodiment according to the invention, the disk controller is configured to have a plurality of channel directors 30 (most often referred to a SCSI adapters when operating according to a SCSI protocol) connecting to a global memory 32 through which all data and commands flow. The global memory 32 is connected to a plurality of disk directors 34 (also typically SCSI adapters) which connect to the disk drives 16. In accordance with this particular embodiment of the invention, each channel director operates over channels 36 and 38 using a SCSI protocol. Each channel director 30 can be connected to one or more host computers over buses 36 (typically, one host I/O Controller per port 40). In the illustrated embodiment, it is the software operation which will be monitored and analyzed.

Figure 3:
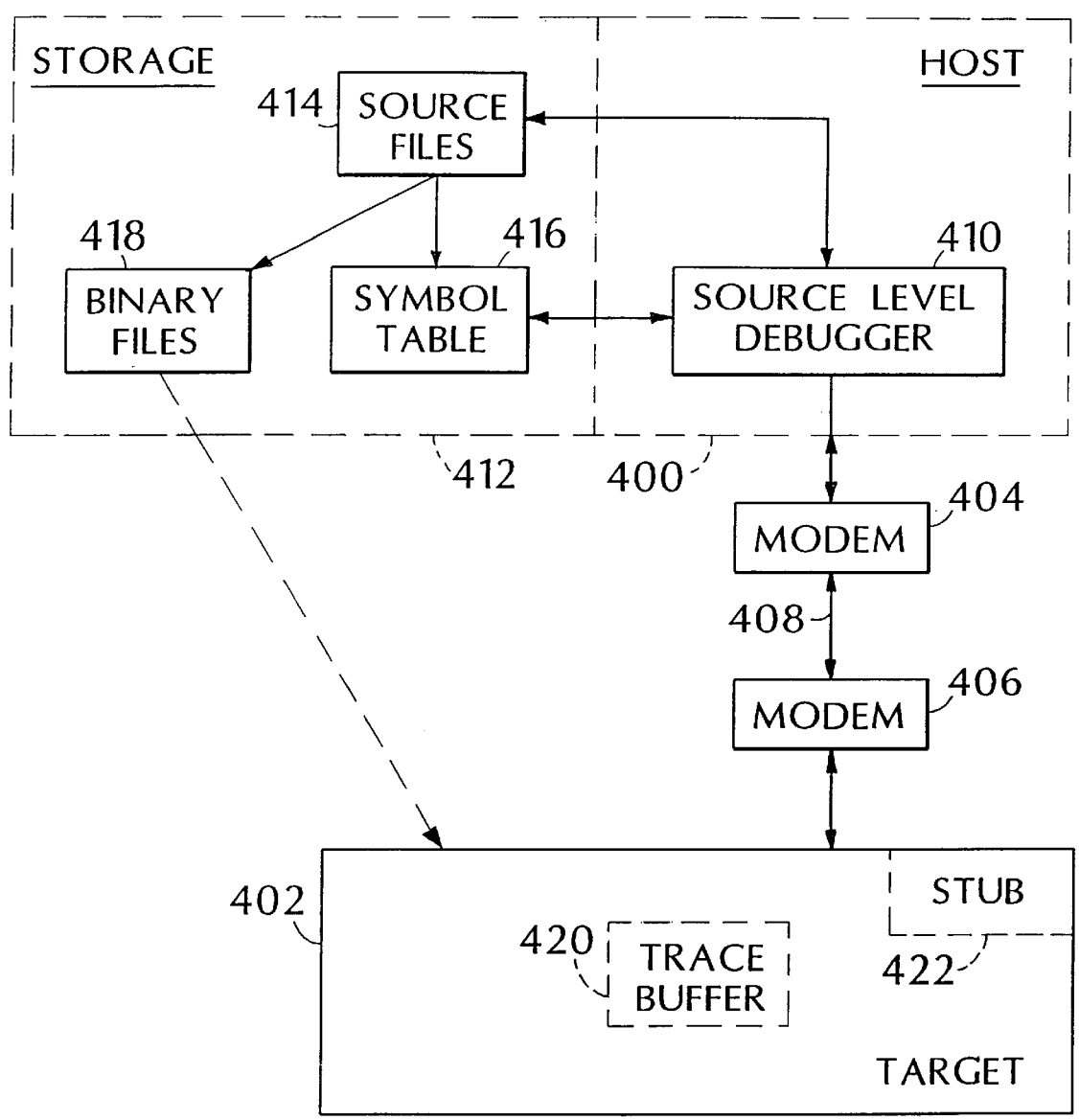
FIG. 3 is a diagrammatic block diagram illustrating a typical operation in accordance with the invention.

Referring now to FIG. 3, in a diagrammatic representation, the host machine 400 is typically located in a site remote from the target machines 402. The host 400 and target 402 communicate over modems 404, 406 and a communications link 408. The host machine includes a source level debugger 410 which has access to a storage 412 containing source files 414, and the compiled symbol table 416 and binary executable file 418 for a program running in the target machine. Typically, the storage 412 contains many such collections of files for different versions of programs running on different target machines. The binary files, are identical to the binary executable program files at the target machine.

The source level debugger, using the symbol table 416, and under the control of either the user or an automatic trace point program, identifies the addresses at which trace points are to be inserted into the executable program running at the target machine, as well as addresses for the variables (or numeric expressions to determine such addresses). That data is sent over communications link 408 to the target machine. At the target machine the stub program uses that data and inserts traps at the trace point addresses, causing at each trace point, the necessary data to be collected and stored in a trace buffer 420. The stub program 422 is included in the target machine as part of its operating programs. Thus, in general operation, a program is compiled and linked and loaded in binary executable form in the target machine while being stored in binary files 418 and symbol files 416. A user, or the system, then defines the trace points and the data to be collected, and sends that set up information to the target machine. The appropriate data is then collected each time a trace point is hit and the trace program is terminated as described hereinafter. A "post mortem" analysis is then performed on all or part of the data collected in the trace buffer.

Figure 4:
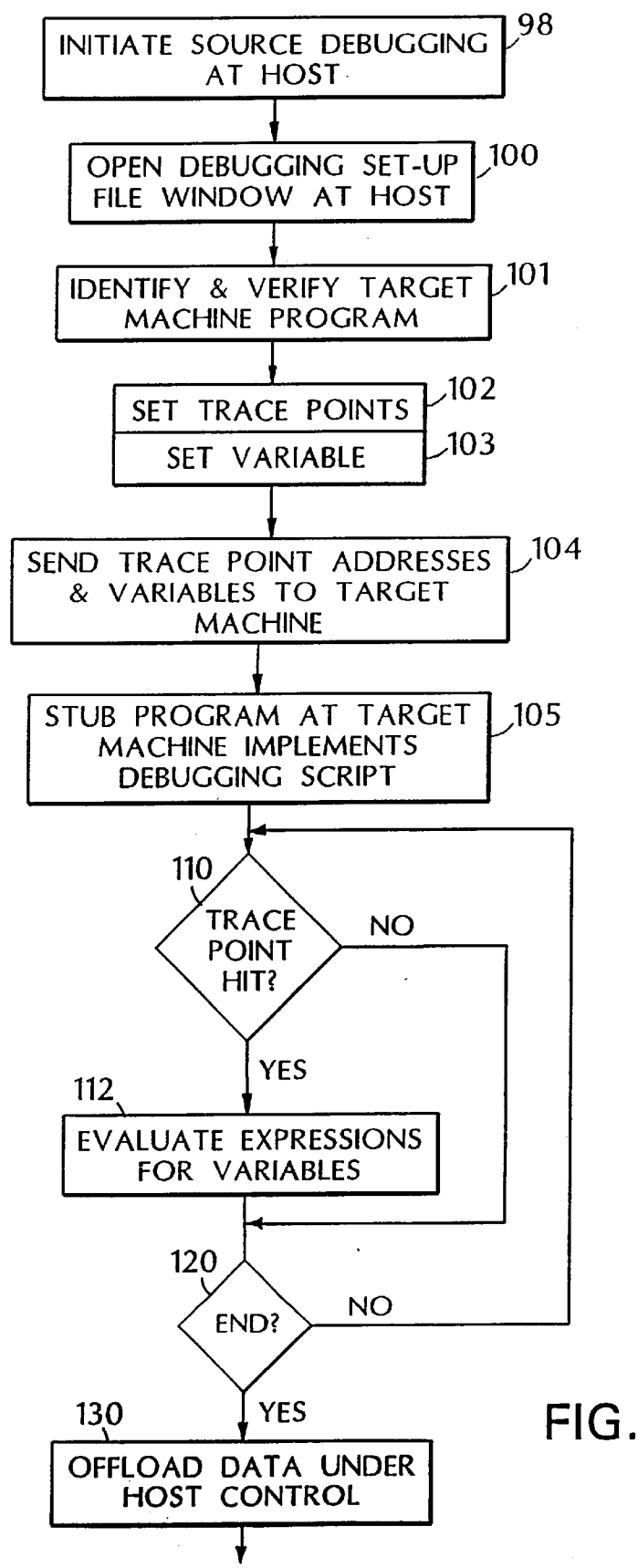
FIG. 4 is a flow chart illustrating operation of one embodiment in accordance with the invention.

Referring now to FIG. 4, in operation, a source level debugging program is initiated at a host computer which is typically remote from the site of the target machine. This is indicated at 98. The debugging program, under user control, opens a source code window, at the host computer, that is, a window on a display screen by which a debug information is created. This is indicated at step 100. The user then identifies a program, running on the target machine, here controller system 14, and the debugger verifies that it has the same version of the program as that which is running on the target machine. This is indicated at 101. The user either automatically or manually sets a series of trace points in the program to be debugged. This is indicated at step 102. The manual setting of the trace points is typically performed at the source code level in the program. Along with each trace point the user either manually or automatically identifies the variables, data for which are collected each time the trace point is reached or "hit". If the trace points are set automatically, a method such as that described in copending U.S. patent application Ser. No. 09/069,608, filed Apr. 29, 1998, and entitled source code debugging tool application, the contents of which are incorporated herein by reference, can be employed. Once the debug setup has been completed by the user, the host sends to the target machine the location of the trace points in the executable code existing on the target machine. The format of the transmitted data allows numeric expressions to be sent from which the location of the desired variables can be derived at the target machine. This is indicated at 103. Typically the addresses and expressions are derived from the variables found in the symbol table ordinarily created and stored by the compiler in creating the executable code of the program. The symbol table is available at the host machine. This address and expression information is transmitted at 104 to the target machine (as debugging set-up data) for use in operation by the stub program there. The target and host systems can be connected, for example, over the internet, by modem, or a high speed communication bus. At the target machine, the so-called "stub" operates to implement the debugging set-up data at 105 and collects the relevant data during operation of the software to be debugged. In this respect, the stub program inserts traps at the trace point addresses identified by the host system and collects the required data each time a "trap" is reached or hit.

As the program to be debugged at the target machine proceeds, the stub operates at each trace point address to trap the code and collect the required data. This is indicated at 110. When the trace point has been hit, the stub operates to acquire the data from the target by evaluating the expressions provided by the host (the variable physical address can change from time to time), and store the acquired data in a target buffer. This is indicated at 112. If the target buffer fills, in this illustrated embodiment of the invention, the buffer wraps around so that old and earlier collected data is overwritten.

The stub thus operates to collect the variable data specified in the debugging set-up even though it is specified at the numeric or expression level. That is, the stub has an expression evaluator, working in reverse polish notation in the format of the preferred embodiment of the invention, which enables the stub to determine the address of the variable, or variables to be collected, even though the address of the variables may change from time to time in the program.

Once all of the program variables have been collected, a pass-count for a trace point has been reached or at a time specified by the host or target system has elapsed, or when a user generated access command is received by the target system, the collected and stored data can be off-loaded, in whole or in part as specified by the host machine, without substantially interrupting the operation of the target machine or the monitored program, that is, while the target machine continues to operate. In a particular aspect, when the pass-count for a trace point is reached, the collection of data will automatically stop and the data will be made available to the host, either automatically or under user control at the host. For example, for a pass count of one, data will be collected when a particular trace point is first reached and can immediately made available to the host for review and analysis. It should also be apparent that the collected data can be returned to the host while the additional data is being collected. This is indicated at step 120. The offloading process can be implemented and controlled by the host as indicated at step 130. In a particular embodiment, the host sends a search query to the target to obtain a limited, well defined, data download.

It is important to note that each time a trace point is reached, the program is trapped and the appropriate variables are collected and stored. This takes on the order of, for example, one millisecond. This is a significant improvement over, for example, those systems which, upon encountering a break point cause the program being monitored to stop, waiting for user input which can require interruptions of one, ten, or more minutes. As a result, the operation of the target machine much more closely resembles that of the machine without the trace points being implemented. Of course, the version of the software in the target machine must be identical to that known to the host computer.

Additions, subtractions, and other modifications of the disclosed preferred embodiment of the invention will be apparent to those practiced in the art and are within the skills of the following claims.

What is claimed is:

1. A method for debugging software running in a target machine comprising defining, in a host machine, trace point locations and variables to be acquired by said software, sending the trace point locations and variables to the target machine, running a stub program in the target machine, collecting, using the stub program, data representing the variables selected by said host machine, when a trace point is reached, and sending said collected data, online, to the host machine without stopping operation of said target machine.

2. The method of claim 1 further comprising determining at the target machine a location for each variable for which data is to be collected, for each trace point.

3. The method of claim 2 further comprising using the stub program at the target machine for collecting the identified data and delivering it to a storage buffer.

4. The method of claim 1 further comprising automatically selecting said trace points at the host machine, and automatically identifying the variables at the host machine.

5. The method of claim 1 further comprising effecting traps in the software code at the target machine at said trace points.

6. The method of claim 1 further comprising collecting data at said target machine until a stop time set by one of the target and host machines.

7. The method of claim 1 further comprising terminating said collecting of data when a trace point is encountered a predetermined number of times.

8. The method of claim 6 further comprising storing the collected data in a target machine buffer, and wrapping around said buffer if said target machine buffer is filled.

9. A method for debugging software running in a disk drive controller comprising defining, in a host machine, trace point locations and variables to be acquired by said software, sending the trace point locations and variables to the disk drive controller, running a stub program in the disk drive controller, collecting, using the stub program, data representing the variables selected by said host machine, when a trace point is reached, and providing said collected data, online, to the host machine without stopping operation of said disk drive controller.

10. The method of claim 9 further comprising effecting traps in the software code at the disk drive controller at said trace points while said disk drive controller performs its normal read and write operations.

11. The method of claim 10 further wherein said providing step comprises providing said collected data to said host machine without interrupting operation of said disk drive controller.

12. The method of claim 9 further comprising terminating said collecting of data when a trace point is encountered a predetermined number of times.

13. Apparatus for debugging software running in a target machine comprising means for defining, in a host machine, trace point locations and variables to be acquired by said software, means for sending the trace point locations and variables to the target machine, means for running a stub program in the target machine, means for collecting, using the stub program, data representing the variables selected by said host machine, when a trace point is engaged, and means for sending said collected data, online, to the host machine without stopping operation of said target machine.

14. The apparatus of claim 13 further comprising means for determining at the target machine a location for each variable for which data is to be collected, at each trace point engagement.

15. The apparatus of claim 13 further comprising means for automatically selecting said trace points at the host machine, and means for automatically identifying the variables at the host machine.

16. The apparatus of claim 13 further comprising means for effecting traps in the software code at the target machine at said trace points.

17. The apparatus of claim 13 further comprising means for collecting data at said target machine until a stop time set by one of the target and host machines.

18. The apparatus of claim 17 further comprising means for collecting data at said target machine until a stop time set by one of the target and host machines.

19. The apparatus of claim 17 further comprising a target machine buffer, means for storing the collected data in the target machine buffer, and means for wrapping around said buffer if said target machine buffer is filled.

20. A computer implemented apparatus for debugging, from a host computer, software running in a target machine comprising software programs stored on magnetic media and requiring the steps of defining in a host computer, trace point locations and variables to be acquired by said software, sending the trace point locations and variables to the target machine, running a stub program in the target machine, collecting, using the stub program, data representing the variables selected by said host computer, when a trace point is passed, and sending said collected data, online, to the host computer without stopping operation of said target machine.

21. The apparatus of claim 19 further having software comprising determining, at the target machine, a location for each variable for which data is to be collected, at each trace point.

22. The apparatus of claim 21 further having software comprising using the stub program at the target machine for collecting the identified data and delivering it to a storage buffer.

23. The apparatus of claim 19 further having software comprising automatically selecting said trace points at the host computer, and automatically identifying the variables at the host computer.

24. The apparatus of claim 19 further having software comprising effecting traps in the software codes at the target machine at said trace points.

25. The apparatus of claim 19 further having software comprising collecting data at said target machine until a stop time set by one of the target machine and host computers.

26. The apparatus of claim 25 further having software comprising storing the collected data in a target machine buffer, and wrapping around said buffer if said target machine buffer is filled.

27. The method of claim 19 further comprising terminating said collecting of data when a trace point is encountered a predetermined number of times.

* * * * *